United States Patent [19]

Suzuki et al.

[11] Patent Number: 5,006,933
[45] Date of Patent: Apr. 9, 1991

[54] LIQUID CRYSTAL TELEVISION

[75] Inventors: Fuminori Suzuki, Sayama; Heihachiro Ebihara, Tokorozawa, both of Japan

[73] Assignee: Citizen Watch Co., Ltd., Japan

[21] Appl. No.: 400,301

[22] Filed: Aug. 29, 1989

[30] Foreign Application Priority Data

Aug. 30, 1988 [JP] Japan ................. 63-213755

[51] Int. Cl.$^5$ .................. H04N 5/440; H04N 5/50
[52] U.S. Cl. .................. 358/236; 358/230; 358/192.1
[58] Field of Search ........... 358/236, 193.1, 192.1, 358/254, 191.1; 455/154, 159

[56] References Cited

U.S. PATENT DOCUMENTS 4,390,902 6/1983 Chin et al. ................. 358/192.1

FOREIGN PATENT DOCUMENTS

0111582 7/1983 Japan ................. 358/192.1
61-295773 12/1986 Japan .

Primary Examiner—Howard W. Britton
Assistant Examiner—Michael Lee
Attorney, Agent, or Firm—Townsend and Townsend

[57] ABSTRACT

In a liquid crystal television, segment electrodes of a liquid crystal panel are divided into image segment electrodes and indicator segment electrodes. A liquid crystal display unit includes an image segment driver for receiving a video signal from a television receiver and driving the image segment electrodes, and an indicator segment driver for receiving a tuning voltage from a tuning voltage control unit and driving the indicator segment electrodes. The image and indicator segment drivers are driven by signals having different voltage waveforms.

8 Claims, 12 Drawing Sheets

LIQUID CRYSTAL TELEVISION

BACKGROUND OF THE INVENTION

1. Field of the Invention

The present invention relates to a liquid crystal television and, more particularly, to a marker channel indicator for displaying a tuned channel of the liquid crystal television.

2. Description of the Related Art

A channel indicator for a liquid crystal television is changing from a mechanical indicator to a panel display indicators. Various types of channel indicator have been proposed. A typical panel display channel indicator uses a monochromatic rod-like pattern extending from the upper end to the lower end of the television screen, and the indicator is moved in the horizontal direction of the screen. Another typical example of the channel indicator uses the right or left end of the screen as an indicator portion in which a short channel marker having a long side in the horizontal direction is vertically moved. A character display indicator using a microcomputer is not almost used in practice.

The following two conventional tuning systems are available: an auto-tuning system for sequentially selecting tuning frequencies with two push buttons; and a mechanical manual system for selecting a desired tuning frequency by turning a rotary volume control.

Of the conventional channel indicators, the indicator using a microcomputer is expensive and cannot be introduced as a product unless other factors for requiring values added to the product are required. Although the channel indicator using the vertical rod-like channel marker is relatively simple, the channel marker overlaps the image. The channel marker must be erased in operation other than channel selection. An indicator display switch (so-called channel call switch) is required when the user wants to know the presently tuned channel without a tuning operation. The channel marker using the short channel marker which has a horizontal long side and is moved vertically at the end of the screen is free from the above problems since the marker can always be displayed outside the image area.

In any conventional channel display scheme, however, the channel marker is displayed by using the same segment driver as an image display driver. The contrast and brightness levels of the marker are almost equal to those of the image, and the marker cannot be easily distinguished from the image. Some users may misunderstand that the marker is part of an image, and therefore, the maker becomes an obstacle during watching of a television program. Even if the marker is displayed to be brighter than the background and vice versa, it is difficult to distinguish the indicator portion from the image portion, and the contrast between the indicator and image portions is unclear. A user who is accustomed to a mechanical indicator for moving a marker of a vivid color in a black background cannot easily accept any conventional panel display channel indicator.

SUMMARY OF THE INVENTION

It is a first object of the present invention to provide a liquid crystal television in which a channel marker can be clearly distinguished from an image.

It is a second object of the present invention to provide a liquid crystal television in which a channel marker is conspicuously distinguished from a background.

It is a third object of the present invention to provide a liquid crystal television wherein image segment electrodes and channel display segment electrodes can be formed in the same pattern in a single manufacturing step.

DETAILED DESCRIPTION OF THE PREFERRED EMBODIMENT

The present invention will be described in detail with reference to the accompanying drawings.

Figure 1:
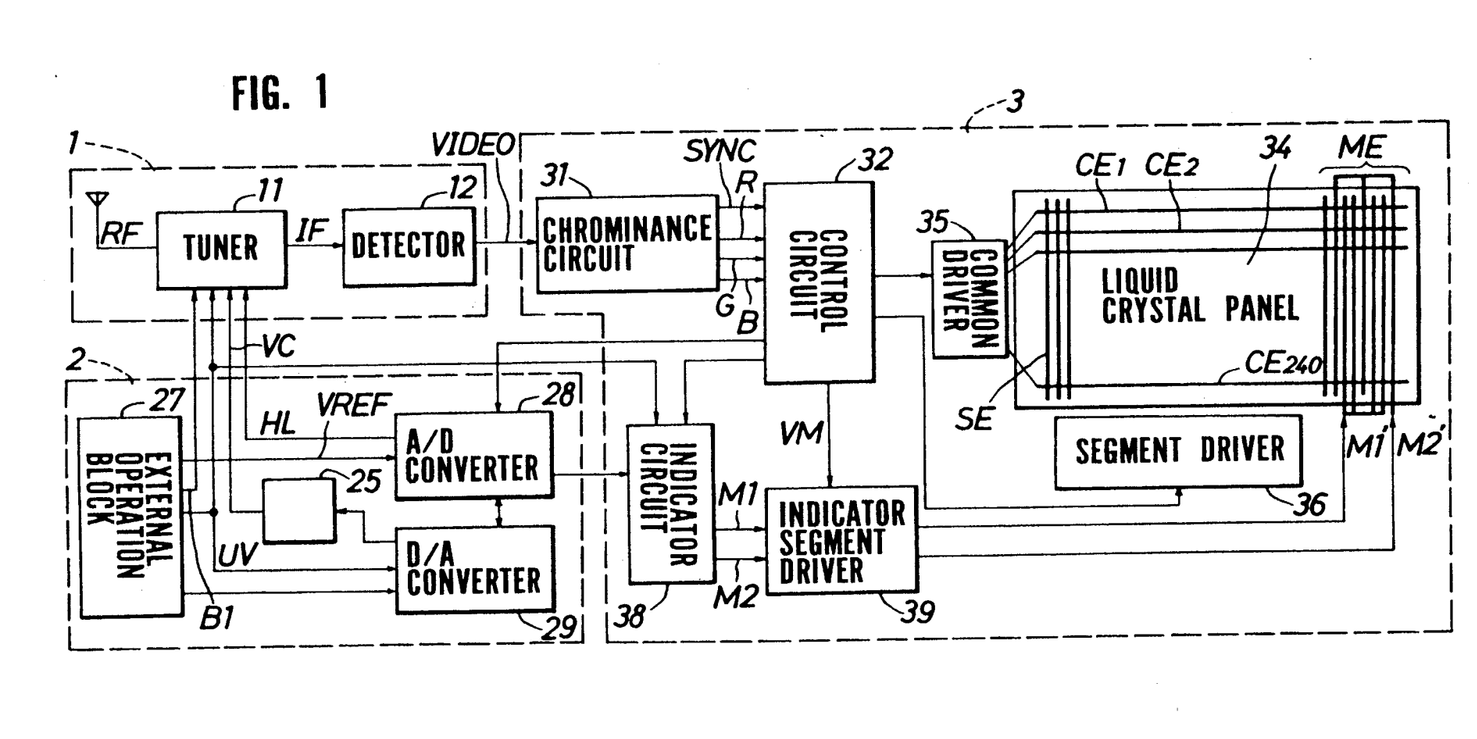
FIG. 1 is a block diagram showing an overall circuit arrangement of a liquid crystal television according to an embodiment of the present invention.

FIG. 1 is a block diagram showing an arrangement of a liquid crystal television according to an embodiment of the present invention. Reference numeral 1 denotes a television receiver for converting an RF signal into a video signal; 2, a tuning voltage control unit for controlling a reception frequency band and a reception channel of the television receiver 1; and 3, a liquid crystal display unit for converting a signal from the television receiver 1 into an image. An audio circuit, a power source circuit, and the like are omitted.

The television receiver 1 comprises a tuner 11 for converting the RF signal into an intermediate frequency signal (to be referred to as an IF signal hereinafter), and a detector 12 for detecting the IF signal and extracting a video signal VIDEO and an audio signal AUDIO.

The tuning voltage control unit 2 comprises an external operation block 27, an A/D converter 28, a D/A converter 29, and a high-voltage transforming transistor circuit 25 for DC-amplifying an output signal from the D/A converter 29.

The liquid crystal display unit 3 includes: a chrominance circuit 31 for separating the video signal VID-EO into a sync signal SYNC and an RGB signal; a control circuit 32 which incorporates a reference oscillator for generating various clock signals and timing signals to A/D-convert the RGB signal and to control a liquid crystal panel driver; a liquid crystal panel 34; a common driver 35 for driving common electrodes of the liquid crystal panel 34; an image segment driver 36 for driving image segment electrodes; an indicator circuit 38 for generating a signal for driving channel indicator segment electrodes on the basis of data from the A/D converter 28; and an indicator segment driver 39. The indicator circuit 38 has a UHF reception output terminal and a VHF reception output terminal and drives segment electrodes ME of an indicator portion of the liquid crystal panel 34 through the indicator segment driver 39.

Figure 11:
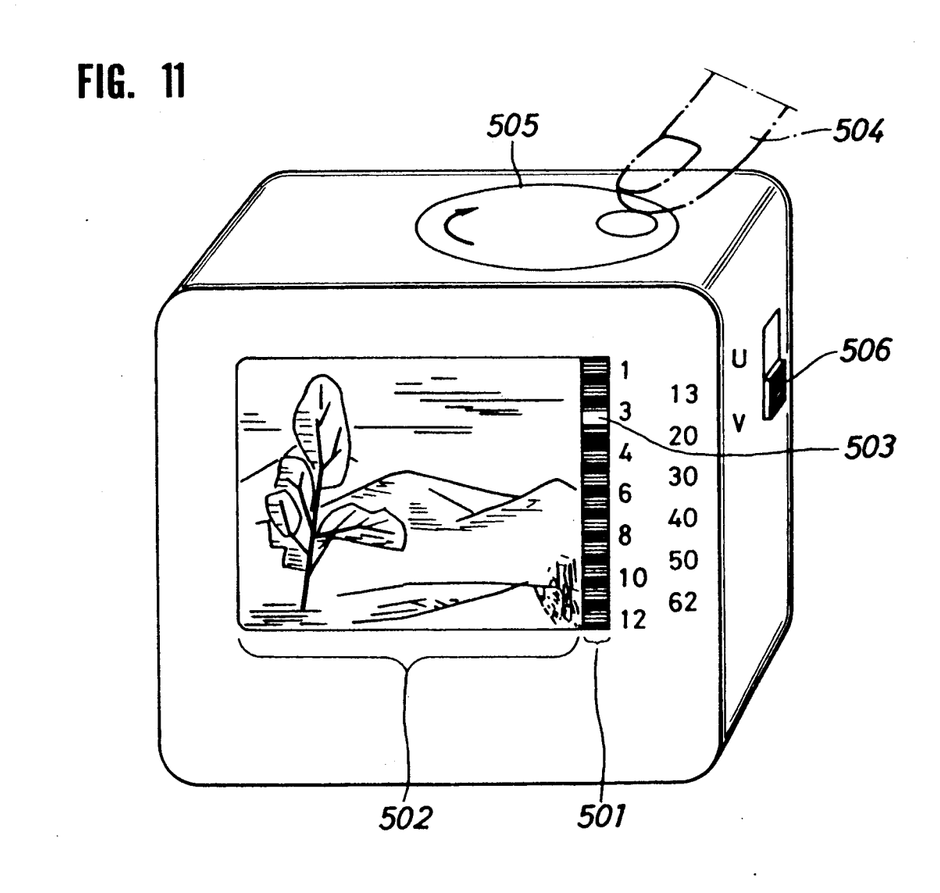
FIG. 11 is a perspective view showing an outer appearance of the liquid crystal television shown in FIG. 1.

FIG. 11 is a perspective view showing an outer appearance of the liquid crystal television according to the embodiment of the present invention. Numerals marked on the right side of the front surface of the television represent channel numbers. More specifically, numerals 1 to 12 represent VHF channel numbers; and 13 to 62, UHF channel numbers. Reference numeral 501 denotes an indicator portion of the liquid crystal panel; 502, an image display portion; and 503, a channel marker displayed on the liquid crystal panel. When a user turns a disc knob 505 with his finger 504 so as to turn a tuning variable resistor 27a, the channel marker 503 is vertically moved. When the knob is continuously turned, the resistance of the variable resistor 27a is set at a high-impedance state and is abruptly changed from the maximum resistance to the minimum resistance or vice versa. In this case, the channel marker 503 is not displayed. When the user further turns the knob 505, the channel marker 503 appears from the opposite side, thereby allowing tuning. In this case, a process for shifting the channel marker 503 to the opposite side is not displayed. The channel marker 503 is shifted as if the marker 503 is moved behind the screen of the television. A slide knob 506 arranged on a side surface of the liquid crystal television case is a UHF/VHF selection knob. When the knob 506 is slid to the upper position, the UHF band is selected. When the knob 506 is slid to the lower position, the VHF band is selected.

Figure 12:
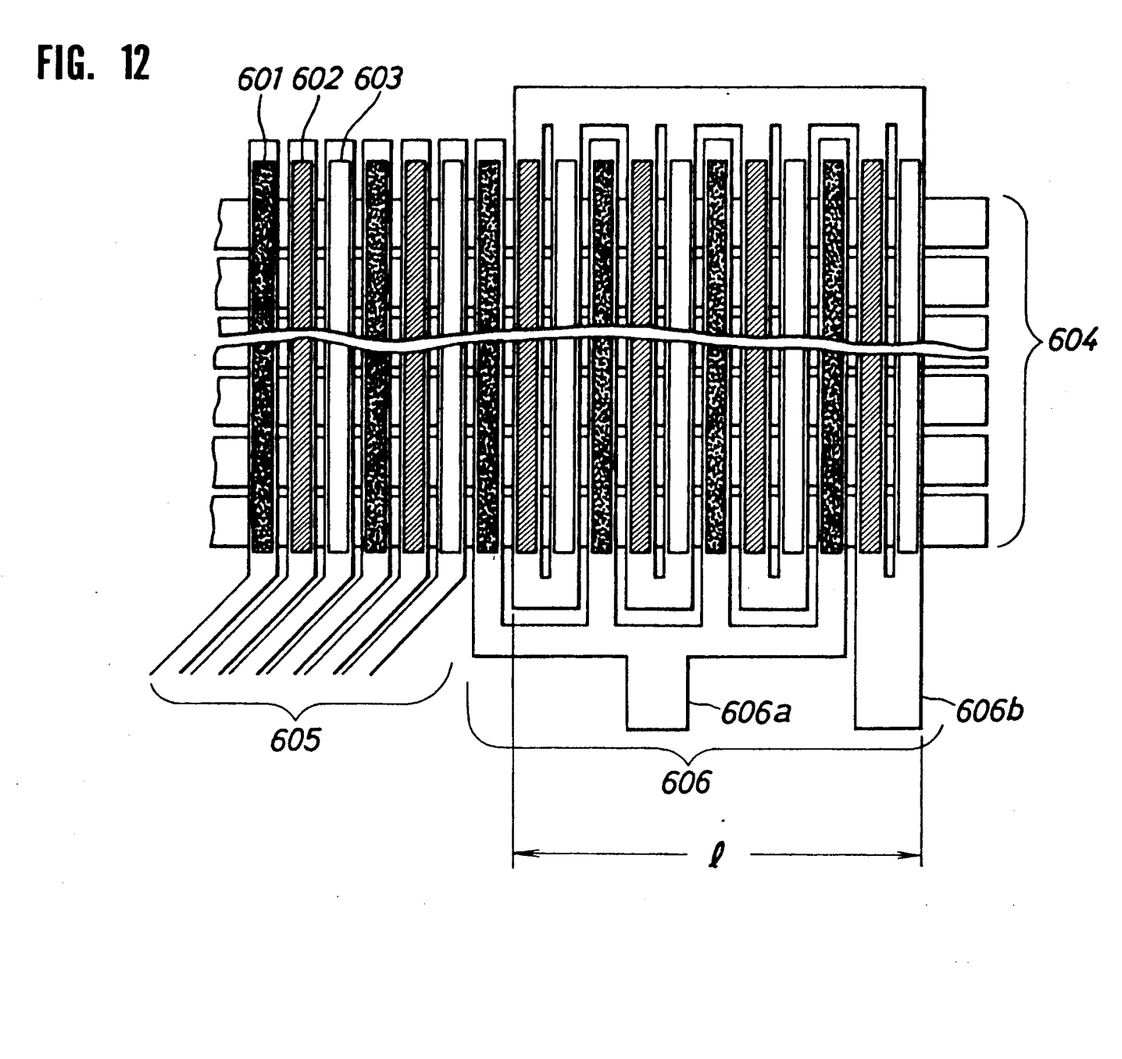
FIG. 12 is a view showing electrode patterns of the liquid crystal panel of the liquid crystal television shown in FIG. 1.

FIG. 12 is a partial plan view for best illustrating an electrode structure of the liquid crystal panel 34. Stripes 601, 602, and 603 indicated by a solid black region, a hatched region and a hollow region represent R, G, B color filters, respectively. Reference numerals 604 denote common electrodes driven by the common driver 35; and 605, image segment electrodes driven by the image segment driver 36. Reference numerals 606 denote indicator segment electrodes constituting the indicator portion of the present invention. A length l of the 12 indicator segment electrodes 606 is that of the channel marker 503.

The indicator segment electrodes 606 have stripe color filters 601 to 603 as in the image portion, and the indicator segment electrodes 606 also have the same stripe filters as in the image portion. Electrodes of one (R) of the colors are connected at one end to constitute a first common electrode terminal 606a, and electrodes of the remaining two colors (G and B) are connected at the other end to constitute a second common electrode terminal 606b. In this embodiment, in order to form the first and second common electrode terminals 606a and 606b on the same side, the second common electrode terminal 606b passes through the outermost segment electrode. The first and second common electrode terminals 606a and 606b are connected to two output terminals of the indicator segment driver 39, respectively.

Figure 2:
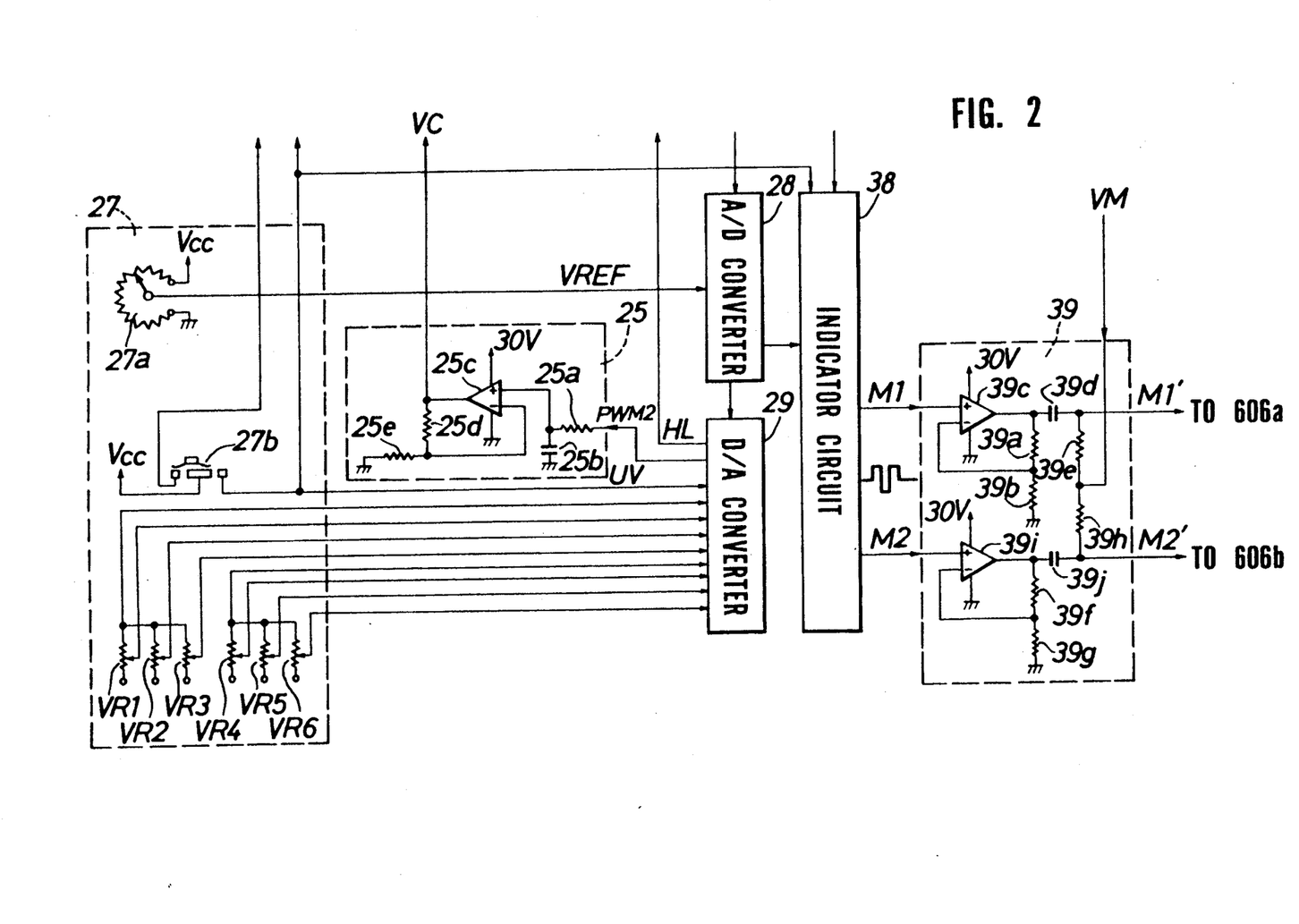
FIG. 2 is a detailed diagram of part of the circuit shown in FIG. 1.

FIG. 2 is a detailed block diagram showing arrangements of the external operation block 27, the high-voltage transforming transistor circuit 25, and the indicator segment driver 39.

The external operation block 27 comprises the tuning variable resistor 27a, a UHF/VHF selection slide switch 27b, and semi-fixed resistors VR1 and VR6. The high-voltage transforming transistor circuit 25 causes a resistor 25a and a capacitor 25b to smooth a signal PWM2 from the D/A converter 29 and causes an operational amplifier 25c to amplify the smoothed output, thereby generating a tuning voltage VC. A gain of the operational amplifier 25c is set to be an appropriate value in accordance with a division ratio of resistors 25d and 25e.

The indicator segment driver 39 is a DC amplifier for amplifying a signal M1 output from the indicator circuit 38 to generate a marker signal M1' which is then applied to the indicator segment electrodes 606a. The indicator segment driver 39 comprises resistors 39a and 39b for determining the gain, an operational amplifier 39c, a capacitor 39d for cutting off a DC component, and a resistor 39e for clamping the liquid crystal drive voltage to a common voltage level VM. Similarly, another DC amplifier applies to the indicator segment electrodes 606b a marker signal M2' obtained by amplifying a signal M2 output from the indicator circuit 39 and comprises resistors 39f, 39g, and 39h, an operational amplifier 39i, and a capacitor 39j.

Figure 3:
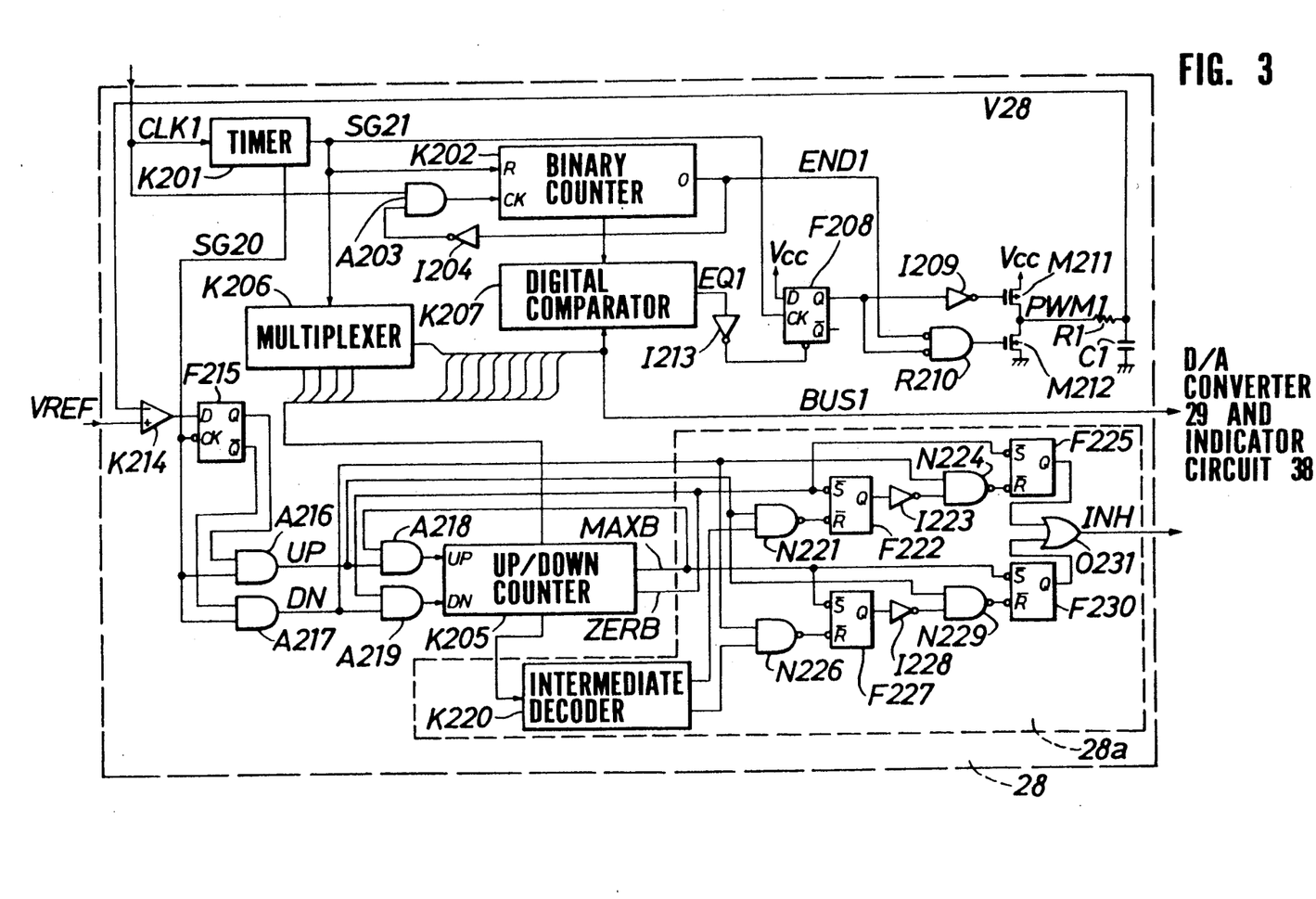
FIG. 3 is a detailed diagram of an A/D converter shown in FIG. 1.
Figure 4:
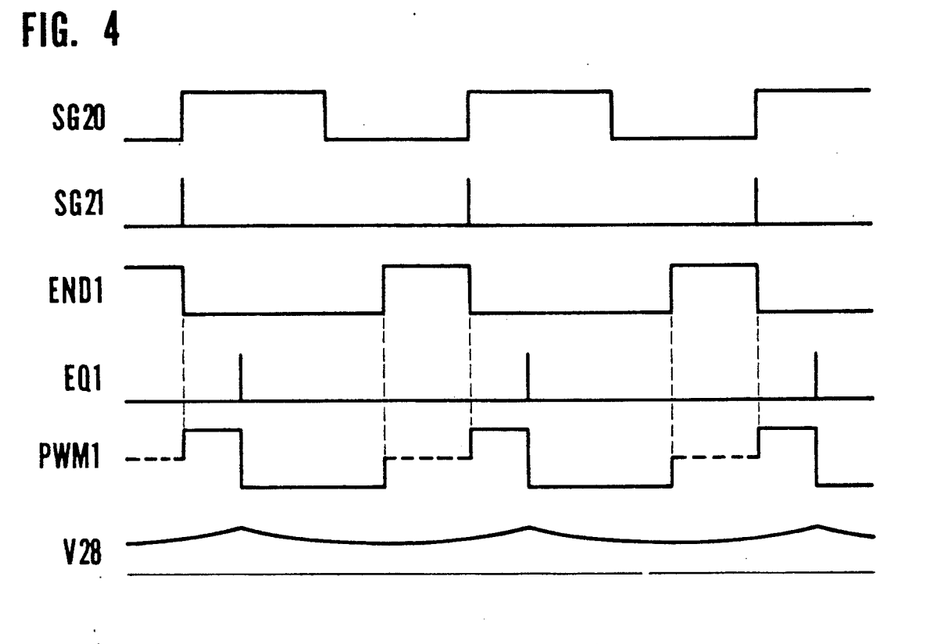
FIG. 4 is a timing chart showing an operation of the A/D converter shown in FIG. 3.

FIG. 3 a block diagram showing a circuit arrangement of the A/D converter 28, and FIG. 4 is a timing chart showing its operation.

Reference symbol K201 denotes a timer for outputting a signal SG20 obtained by frequency-dividing a clock signal CLK1 and a signal SG21 obtained by converting the signal SG20 into a pulse having a large pulse width. Reference symbol K202 denotes a binary counter with a reset terminal for outputting a count-up signal END1. The binary counter K202 counts pulses of the clock signal CLK1 through an AND gate A203. When the count of the binary counter K202 reaches a predetermined value, the count-up signal END1 is inverted by an inverter I204, and the inverted signal disables the AND gate A203, thereby interrupting the count-up operation.

Reference symbol K205 denotes a 12-bit up/down counter having an UP count clock input terminal UP and a DOWN count clock input terminal DN. The 12-bit up/down counter K205 incorporates a decoder for outputting a negative logic signal MAXB representing that the actual count reaches the maximum count and a negative logic signal ZERB representing that the actual count is zero.

Reference symbol K206 denotes a known multiplexer for switching lower 4 bits of the up/down counter K205 at a timing of the signal SG21, outputting signals representing different numbers of outputs in accordance with bit weighting, and outputting a one-bit signal.

A digital comparator K207 compares the content of the 9 bits as a sum of upper eight bits of the up/down counter K205 and one bit from the multiplexer K206 with the content of nine bits of the binary counter K202.

If a coincidence is established by the digital comparator K207, a coincidence signal EQ1 is output.

The count-up signal END1 and an output from a D flip-flop F208 set at the leading edge of the signal SG21 and reset by an inverted signal of the coincidence signal EQ1 are applied to the gates of a p-channel FET M211 and an n-channel FET M212 through an inverter I209 and a NOR gate R210. Therefore, a tristate signal PWM1 appears from the drains of the FETs M211 and M212. The tristate signal PWM1 is kept high from the signal SG21 to the coincidence signal EQ1 and goes low from the end of the signal END1. The tristate signal PWM1 is set at a high impedance until the next SG21 signal is generated. A voltage V28 obtained by smoothing the tristate signal PWM1 through a resistor R1 and a capacitor C1 is almost a DC voltage, the level of which is changed by a pulse width of the tristate signal PWM1. The voltage V28 is changed in accordance with the content of the up/down counter K205. Reference symbol K214 denotes a voltage comparator for comparing the voltage V28 with a voltage VREF from the tuning variable resistor 27a. When the voltage V28 is lower than the voltage VREF, the voltage comparator K214 is set at high level. Otherwise, the voltage comparator K214 is set at low level. An output from the voltage comparator K214 is sampled at a timing of the signal SG20 by a D flip-flop F215. Each of AND gates A216 and A217 receives an output Q and $\overline{Q}$ from the flip-flop F215 as one input and receives the signal SG20 as the other input. Outputs from the AND gates A216 and A217 are the up signal UP and the down signal DN, respectively. The up signal UP together with the signal MAXB from the up/down counter K205 is input to an AND gate A218. The down signal DN together with the signal ZERB is input to an AND gate A219. Outputs from the AND gates A218 and A219 are input to the terminals UP and DN of the up/down counter K205. The up/down counter K205 is arranged not to perform up-counting exceeding the maximum value or down-counting below zero. When the voltage V28 is lower than the voltage VREF, up-counting is performed to increase the voltage V28. However, when the voltage V28 is higher than the voltage VREF, down-counting is performed to decrease the voltage V28.

With the above arrangement, the up/down counter K205 performs counting to equalize the voltage V28 with the voltage VREF. As a result, a result obtained by A/D-converting the voltage VREF is output from the up/down counter K205.

A marker erasure circuit 28a is added in the A/D converter 28 to display the marker as if it is shifted behind the screen. An arrangement and operation of the marker erasure circuit 28a will be described below.

Reference symbol K220 denotes an intermediate value decoder for outputting an intermediate bit of the up/down counter K205 directly or a signal of high level when a present value becomes an intermediate value between the maximum value and zero. Reference symbols F225 and F222 denote SR flip-flops set by the zero count signal ZERB. Reference symbol N221 denotes a NAND gate for resetting the SR flip-flop F222 in accordance with a logical AND signal of the output from the intermediate value decoder K220 and the up signal UP. Reference symbol N224 denotes a NAND gate for resetting the SR flip-flop F225 in accordance with a logical AND signal of the output from the SR flip-flop F222 and an inverted signal from an inverter I223. More specifically, the SR flip-flop F225 is set in response to the zero count. Thereafter, when counting continues until the up signal UP is output, the SR flip-flop F225 is not reset even if the count exceeds the intermediate value and is reset by the maximum count. Similarly, reference symbols F227 and F230 denote SR flip-flops set in response to the maximum count signal MAXB. Reference symbol N226 denotes a NAND gate for resetting the SR flip-flop F227 in accordance with a logical AND signal of the down signal DN and the output signal from the intermediate value decoder K220. Reference symbol N229 denotes a NAND gate for resetting the SR flip-flop F230 in accordance with a logical AND signal of the up signal UP and an inverted signal obtained by inverting the output from the SR flip-flop F227 by an inverter I229. In this case, the SR flip-flop F230 is set in response to the maximum count. Thereafter, when counting continues until the down signal DN, the SR flip-flop F230 is not reset until the zero count. When the VREF is abruptly changed from the maximum level to zero or vice versa, i.e., when the resistance of the tuning variable resistor 27a is abruptly changed, the SR flip-flop F225 or F230 is kept set.

In this manner, the SR flip-flops F225 and F230 are set at the zero and maximum counts of the up/down counter K205. The SR flip-flops F225 and F230 are reset when the up/down operation can be performed within the range of predetermined values. Output signals from the flip-flops F225 and F230 are logically ORed by an OR gate 0231 and the OR signal is output as an indicator inhibit signal INH. Therefore, the marker display can be erased at an appropriate timing and the marker is displayed again as if it passes behind the screen.

The sum of upper eight bits of the up/down counter K205 and one bit from the multiplexer K206 is supplied to the D/A converter 29 and the indicator circuit 38 through a bus line BUS1.

Figure 5:
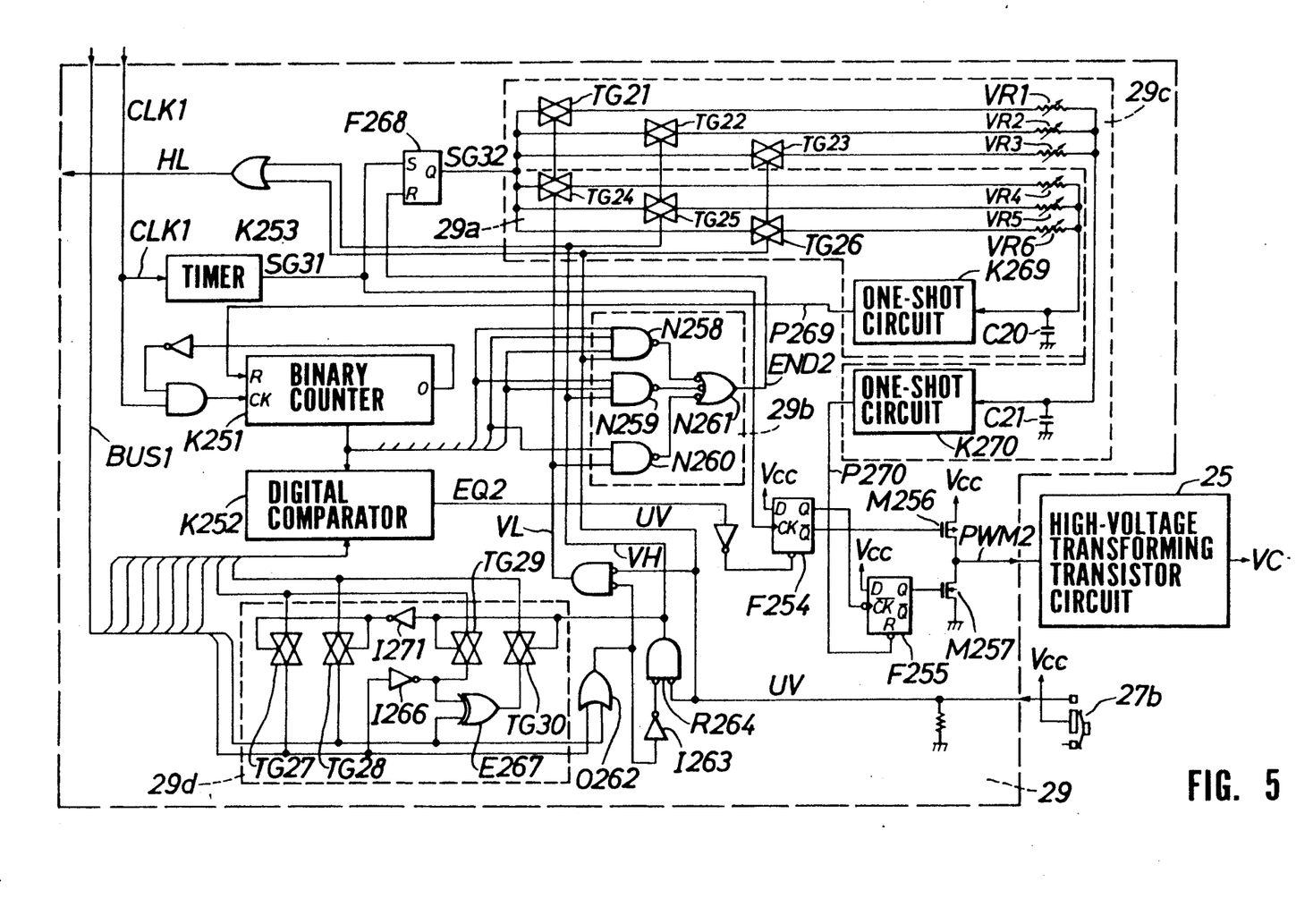
FIG. 5 is a detailed diagram of a D/A converter shown in FIG. 1.
Figure 6:
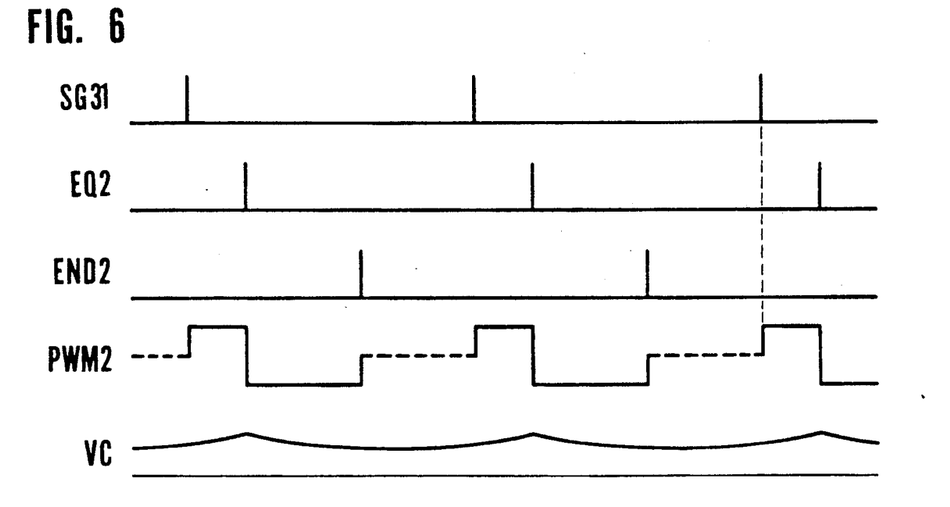
FIG. 6 is a timing chart showing an operation of the D/A converter shown in FIG. 5.

FIG. 5 is a block diagram showing an arrangement of the D/A converter 29, and FIG. 6 is a timing chart showing its operation.

Basically, the D/A converter 29 comprises: a timer K253 for frequency-dividing the signals C1 and CK as in the A/D converter 28 and outputting a pulse signal SG31; a first delay circuit 29a for offset adjustment for receiving the pulse signal SG31 and outputting a delayed signal P269; a binary counter K251 for counting pulses of the clock signal CLK1, the binary counter K251 being started in response to the delayed signal P269 and stopped in response to the count-up signal; a digital comparator K252 for comparing the content of the binary counter K251 with the content of the bus line BUS1 as an A/D conversion result from the A/D converter 28 and for outputting a coincidence signal EQ2; a flip-flop F254 set in response to an output signal from the timer K253 and reset in response to an output from the digital comparator K252; a decoder 29b for decoding an output from the counter K251; a flip-flop F255 set in response to the trailing edge of an output Q from the flip-flop F254 and reset in response to a signal P270 generated by a second delay circuit 29c for gain adjustment using an output signal END2 from the decoder 29b; and CMOS transistors M256 and M257 for receiving output signals from the flip-flops F254 and F255 and outputting the tristate signal PWM2. The tristate signal PWM2 is set at high level during a period from the signal SG31 to the coincidence signal EQ2, is set at low level during a period from the coincidence signal EQ2 to a decoder output signal END2, and is set in a high-impedance state (indicated by the broken line) until the next SG31 signal when the time constants of the first and second delay circuits 29a and 29b are set to zero. The tristate signal PWM2 is smoothed by an integrator comprising the resistor 25a and the capacitor 25b (FIG. 2). The integrated signal is DC-amplified by an operational amplifier or the like, thereby obtaining the tuning voltage VC. The tuning signal VC is almost a DC voltage, the level of which is changed in accordance with a pulse width of the tristate signal PWM2. Tuning of the tuner 11 is performed by the level of the voltage VC.

The decoder 29b for decoding an output (maximum count "511") from the binary counter K251 comprises AND gates N258 to N260 for decoding upper three bits into three different data, and a NAND gate N261 for outputting an OR output (as the output END2) as a result of three decoded signals. One of the three decoded outputs is selected in accordance with the reception frequency band. As a result, the output timing of the signal END2 corresponds to a count "448" of the counter K251 for the UHF band; a count "320" for the VHF-HI band; and a count "128" for the VHF-LOW band.

Of the signals UV, VH, and VL representing the reception frequency bands, the signal UV from the external operation block is a U/V selection signal which is set at high level for UHF and low level for VHF. The high/low level determination for the VHF is set as follows. One of the upper two bits of the bus line BUS1 is set at high level, the signal UV is set at high level. The signal VH representing the VHF-HI is obtained by calculating a logical OR signal of upper two bits on the bus line BUS1 through an OR gate 0262, by transmitting the signal obtained by inverting the OR signal by the inverter I263, and by obtaining a NOR signal of the inverted signal together with the signal UV through a NOR gate R264. The signal VL representing the VHF-LOW is obtained by a NOR gate R265 for receiving an output signal from the OR gate 0262 and the signal UV.

The D/A converter 29 of this embodiment includes a subtracter arranged between the bus line BUS1 and the digital comparator K252. When the value n of the bus line BUS1 exceeds "128" and the mode is switched from the VHF-LOW to the VHF-HI, the value supplied to the comparator K252 is switched to "n-128". In this embodiment, a subtraction of only upper two bits is performed by a simple gate circuit consisting of an inverter I266 and an exclusive OR gate E267. A difference from the subtracter is output through transmission gates TG29 and TG30 if the difference represents the VHF-HI. Otherwise, signals prior to the subtraction are gated through the transmission gates TG27 and TG28.

The liquid crystal television also includes a circuit which constitutes the first delay circuit 29a for delaying a period from the leading edge of the timer output signals SG31 to the start of counting of the binary counter K251, and the second delay circuit 29c for delaying a period from the output timing of the decoded result signal END2 of the binary counter K251 to resetting of the flip-flop F255. An SR flip-flop F268 is arranged to generate a signal, the leading edge of which represents an output timing of the timer signal SG31 and the trailing edge of which represents an output timing of the decoded result signal END2 of the binary counter K251. An output signal SG32 from the SR flip-flop F268 is output to the first and second delay circuits 29a and 29c.

The first delay circuit 29a comprises transmission gates TG24, TG25, and TG26 for switching the output signal SG32 from the RS flip-flop 268 in accordance with the signals VL, VH, and UV, a first RC time constant circuit constituted by semi-fixed resistors VR4 to VR6 and a capacitor C20, and a one-shot circuit K269. The signal SG32 is delayed by the first delay circuit 29a. The leading edge of the signal SG32 is converted into the narrow pulse signal P269 by the one-shot circuit K269. The pulse signal P269 is supplied to the reset terminal of the binary counter K251.

The second delay circuit 29c comprises transmission gates TG21, TG22, and TG23 for switching the signal SG32 in accordance with the signals VL, VH, and UV, and a second RC time constant circuit comprising semi-fixed resistors VR1 to VR3 and a capacitor C21, and a one-shot circuit K270.

The signal SG32 is delayed by the second delay circuit 29c, and its trailing edge is converted into a narrow negative pulse signal by the one-shot circuit K270. This pulse signal is input to the reset terminal of the flip-flop F255.

With the above arrangement, a predetermined period of time is assigned to the high period of the tristate signal PWM2 without adversely affecting the low period, and the first delay circuit 29a adjusts the offset of the tuning voltage VC. The low period is prolonged by a predetermined period of time by the second delay circuit 29c to shorten the high-impedance period, thereby performing gain adjustment.

Figure 7A:
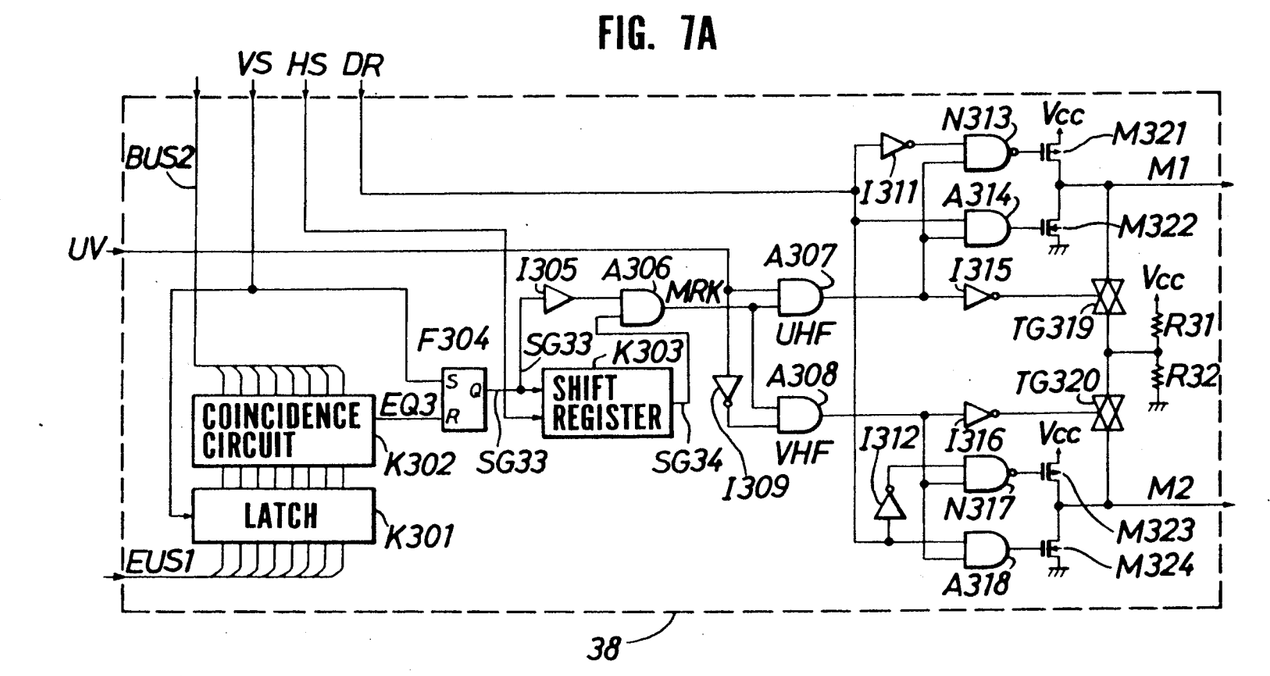
FIG. 7A is a detailed diagram showing an indicator circuit shown in FIG. 1.
Figure 7B:
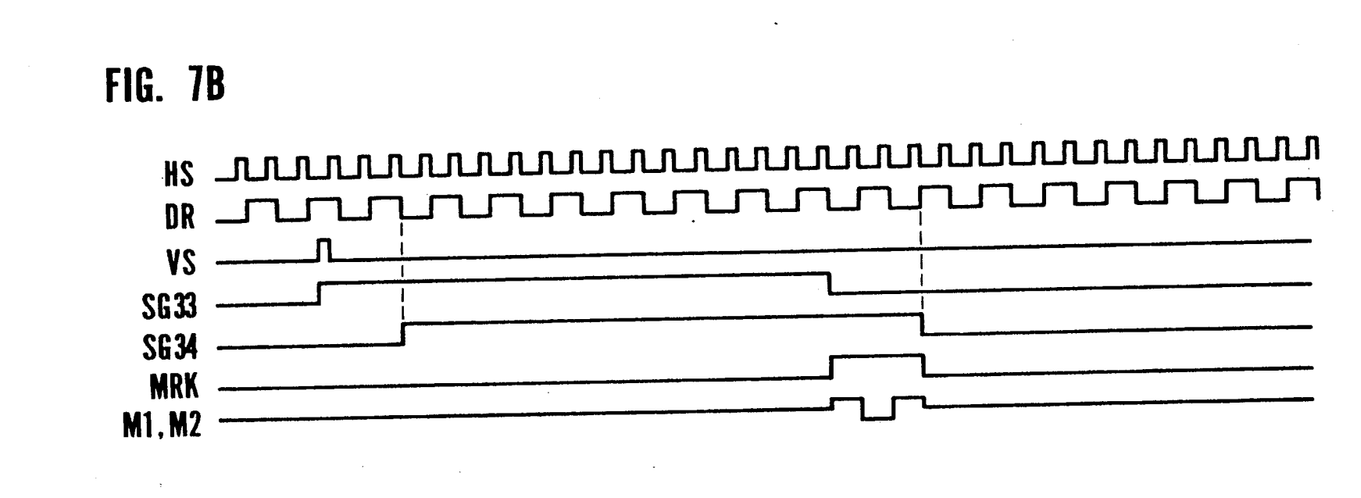
FIG. 7B is a timing chart showing an operation of the indicator circuit shown in FIG. 7A.

FIG. 7A is a block diagram showing an arrangement of the indicator circuit 38, and FIG. 7B is a timing chart showing signals of the circuit components in the indicator circuit 38. Reference numeral K301 is a latch for latching the A/D-converted data from the A/D converter 28 through the bus line BUS1. When a vertical sync signal VS from the control circuit 32 is coupled to a latch enable terminal LE, the latch K301 starts the latch operation at that timing. More specifically, the latch K301 latches upper eight bits out of the nine bits. An 8-bit data signal is transmitted from the control circuit 32 onto a bus line BUS2. This data represents a count obtained by counting pulses of a horizontal sync signal HS from the zero count set at the start of scanning of the common driver. Reference symbol K302 denotes a coincidence circuit for comparing data on the bus line BUS2 with the content of the latch K301. Reference symbol F304 denotes an SR flip-flop set in response to the vertical sync signal VS and reset in response to an output signal EQ3 from the coincidence circuit K302. Reference symbol K303 denotes a shift register for shifting an output signal SG33 from the SR flip-flop F304 at timings of the horizontal sync signal HS. In this embodiment, the shift register K303 is a 3-stage shift register for outputting a signal SG34 which is delayed by 3H (three horizontal scanning lines) in accordance with a width of a channel marker (to be described later). A signal MRK having the pulse width 3H and rising in response to the coincidence signal EQ3 is obtained in accordance with an inverter I305 for outputting an inverted signal of the output signal from the SR flip-flop F304 and an AND gate A306 for inputting an output signal SG34 from the shift register K303. When the indicator segment electrodes 606 are driven at pulse timings of the signal MRK, the marker of the channel indicator can be displayed. AND gates A307 and A308 together with an inverter I309 for inverting the UHF/VHF selection signal UV constitute a selector. The AND gate A307 outputs the signal MRK during UHF reception. The AND gate A308 outputs the signal MRK during VHF selection. A signal DR from the control circuit 32 represents a polarity of a selective scanning signal of the common driver 35. The signal DR is input to inverters I311 and I312 and AND gates A314 and A318. Outputs from the inverters I311 and I312 are input to NAND gates N313 and N317. One input terminal of each of the AND gate A314 and NAND gate N313 is connected to the output of the AND gate A307. The other input terminal of each of the AND gate A318 and the NAND gate N317 receives an output of the AND gate A308. Reference symbol M321 denotes a p-channel FET; M322, an n-channel FET driven by the AND gate A314. The drains of the FETs M321 and M322 are connected to each other, and the common terminal serves as a UHF channel marker ON terminal. Reference symbol M323 denotes a p-channel FET driven by the NAND gate N317. Reference numeral M324 denotes an n-channel FET driven by the AND gate A318. The drains of the FETs N317 and N318 are connected to each other, and this common terminal serves as a UHF channel marker ON terminal.

An operation for outputting a marker signal from the indicator circuit 38 will be described below.

Assume that the band is set as a UHF band. In this state, the AND gate A307 is kept enabled. The signal MRK is supplied to the NAND gate N313 and the AND gate A314. As a result, the marker signal M1 is output by the signals MRK and DR, as shown in FIG. 7B.

When the band is switched to the VHF band, the AND gate A308 is set in an enable state, and the signal M2 is switched and output. The channel marker signals M1 and M2 are fixed to an intermediate potential during the low period of the signal MRK, i.e., a period except for the marker ON timing by the inverters I315 and I316 and the transmission gates T319 and T320, as shown in FIG. 7B. As a result, the signals M1 and M2 serve as a tristate signal. The intermediate potential is obtained by dividing a voltage by resistors R31 and R32.

Driving of the image and indicator portions of the liquid crystal television according to the present invention will be described with reference to FIGS. 8 and 9.

Figure 8:
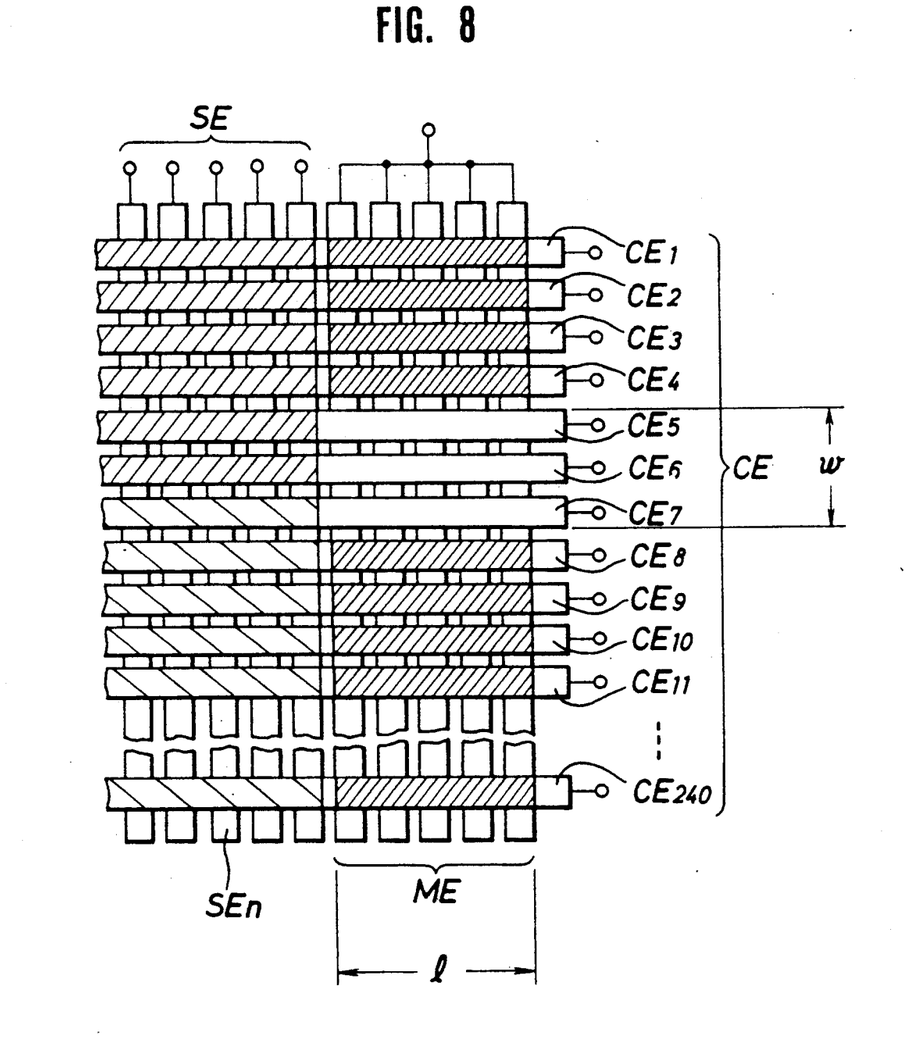
FIG. 8 is a view showing an electrode structure of the indicator section of the liquid crystal television shown in FIG. 1.

FIG. 8 is a view similar to FIG. 12, showing an electrode structure as part of the liquid crystal panel. For the illustrative convenience, the image segment electrodes SE and the indicator segment electrodes ME are not divided into R, G, and B component electrodes, but are represented by single electrodes. In the illustrated embodiment, five indicator segment electrodes ME are shown. A length l of the channel display marker which is turned on in the indicator portion is determined by the number of indicator segment electrodes ME, i.e., 5. A width l of the marker is determined by the number of common electrodes. In this embodiment, the number of common electrodes is 3.

FIG. 9 shows waveforms of signals applied to the common electrodes CE and the segment electrodes SE and ME and waveforms of voltages applied between these electrodes. More specifically, FIG. 9 shows waveforms of scanning signals (a) applied to the common electrodes CE, a waveform of a marker signal (b) applied to the indicator segment electrodes ME, a waveform of an image signal (c) applied to the image segment electrodes SE, waveforms of voltages (d) applied between the common electrodes CE and the indicator segment electrodes ME, and waveforms of voltages (e) applied between the common electrodes CE and the image segment electrodes SE. The signals or voltages (a) to (e) are plotted on the same time scale. However the magnitudes of the image signal (c) and the voltages (e) are exaggerated because the actual magnitudes are too small to be plotted.

Figure 9A:
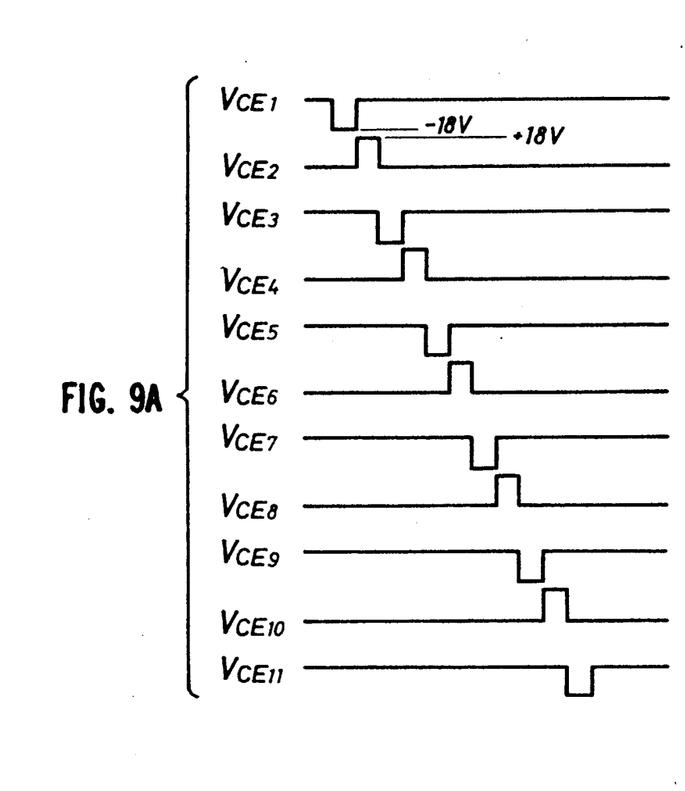
FIGS. 9A–9E are timing charts showing waveforms of signals applied to the electrodes of a liquid crystal panel.

As shown in FIG. 8, the common electrodes CE consist of 240 electrodes, i.e., CE1, CE2, ... CE240 from the above, and selection pulses as the scanning signals (a) in FIG. 9 are sequentially applied to the common electrodes CE1, CE2, ..., CE240. The polarities of the selection pulses are inverted in units of lines. The peak value of the selection pulse is ±18 V. Each common electrode in a nonselected state is set at a common potential.

When the marker signals M (M1' or M2') ((b) in FIG. 9) of a peak value of ±9 V are applied to the five indicator segment electrodes ME, voltages (d) in FIG. 9 are applied between the indicator segment electrodes ME and the common electrodes CE1, CE2, ... CE11. In this case, voltages across the electrodes will be examined for the common electrodes. The timings of the marker signals M of the peak value of ±9 V applied to the indicator segment electrodes ME are offset from the scanning signals of ±18 V applied to the common electrodes CE1 to CE4 and CE8 to CE11. The maximum value of the voltages applied across the electrodes becomes ±18 V which is equal to the peak value of the scanning signal. In this case, the liquid crystal molecules located between the electrodes are not driven.

Figure 9B:
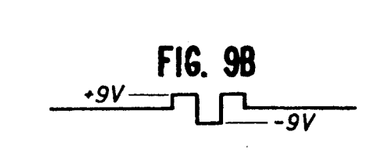

The scanning signals and the marker signals M have identical timings for the common electrodes CE5, CE6, and CE7. The voltage applied between the common electrodes and the indicator segment elements ME are given as ±9 V ±18 V = ±27 V in the period indicated by hatched portion in (b) of FIG. 9. Therefore, the liquid crystal located in the overlap portion between the common electrodes CE5, CE6, and CE7 and the corresponding indicator segment electrodes ME is driven, so that the marker having the width w and the length l is displayed. The length l of the marker is equal to the horizontal distance of the indicator segment electrodes ME consisting of five segment electrodes. The marker width w is equal to the vertical distance of the three common electrodes CE5, CE6, and CE7.

The scanning signal (a) in FIG. 9 is repeatedly applied from the control driver 35 (FIG. 1) to the common electrodes CE every vertical sync period. The marker signal M (b) in FIG. 9 is repeatedly applied from the indicator driver 39 (FIG. 1) to the indicator segment elements ME. The intersection between both the electrodes is turned on as a marker and is kept on.

The position of the waveform of the marker signal M (b) in FIG. 9 is changed in corresponding with the selected channel in accordance with the tuning voltage VC from the high-voltage transforming transistor circuit 25 in the external operation block 27 (FIG. 2). The corresponding common electrodes are sequentially selected to change the ON position of the marker, thereby allowing tuning.

If an NTSC video signal having one field of 262.5 H is assumed and a video signal on the 240 H is displayed on a liquid crystal screen, an rms (root-mean-square) voltage applied to the liquid crystal in the indicator portion is given in a marker ON state ($V_{MON}$) and a marker OFF state ($V_{MOFF}$) as follows:

$$V_{MON} = \sqrt{\{2 \times 9^2 + (18 + 9)^2\}/262.5} = 1.842(V) \quad (1)$$

$$V_{MOFF} = \sqrt{\{3 \times 9^2 + 18^2\}/262.5} = 1.470(V)$$

$$V_{MON}/V_{MOFF} = 1.254$$

Figure 9C:
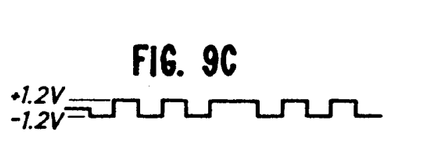
Figure 9D:
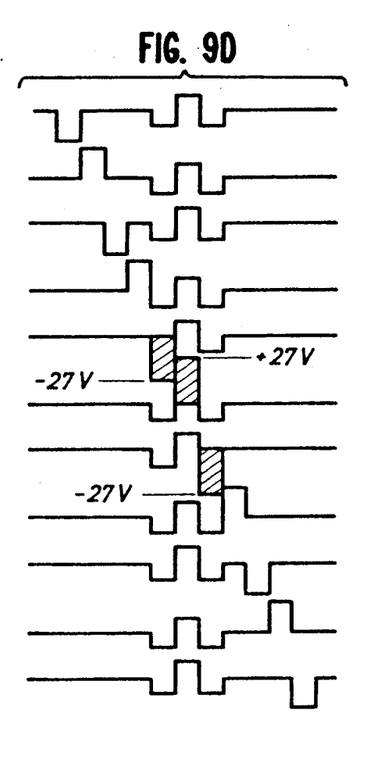
Figure 9E:
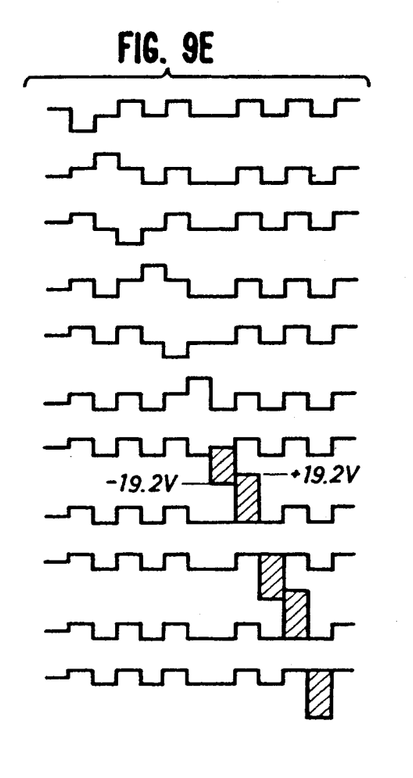

A plurality (e.g., 640) of image segment electrodes SE are used. A voltage applied across the common electrodes CE upon application of the image signal (c) in FIG. 9 to one of the segment electrodes SEn is given as the voltage (e) in FIG. 9.

The scanning signals applied to the common electrodes CE1 to CE6 have the same polarity as that of the image signals of the peak value of ±1.2 V applied to the image segment electrodes SEn and overlap the image signals, the maximum value of the voltage applied between the electrodes is ±18 V ±1.2 V = ±16.8 V. In this case, the liquid crystal molecules located between these electrodes are not driven.

The scanning signals applied to the common electrodes CE8, CE9, . . . have the polarity opposite to that of the image signals of the peak value of ±1.2 V applied to the image segment electrodes SEn and overlap the image signals, the maximum value of the voltage applied between the electrodes is ±18 V ±1.2 V = ±19.2 V. In this case, the liquid crystal molecules located between these electrodes are driven.

In this case, the rms voltage applied to the liquid crystal of the image portion is given as in the ON state ($V_{GON}$) and the OFF state ($V_{GOFF}$) as follows.

$$V_{GON} = \sqrt{\{239 \times 1.2^2 + (18 + 1.2)^2\}/262.5} = 1.648V \quad (2)$$

$$V_{GOFF} = \sqrt{\{239 \times 1.2^2 + (18 - 1.2)^2\}/262.5} = 1.545V$$

$$V_{GON}/V_{GOFF} = 1.067$$

As is apparent from the comparison between equations (1) and (2), the $V_{ON}/V_{OFF}$ value in the indicator portion is larger than the $V_{GON}/V_{GOFF}$ value in the image portion. This indicates that the contrast between the marker (ON state) and the background in the indicator portion is higher than that of the image portion.

Figure 10:
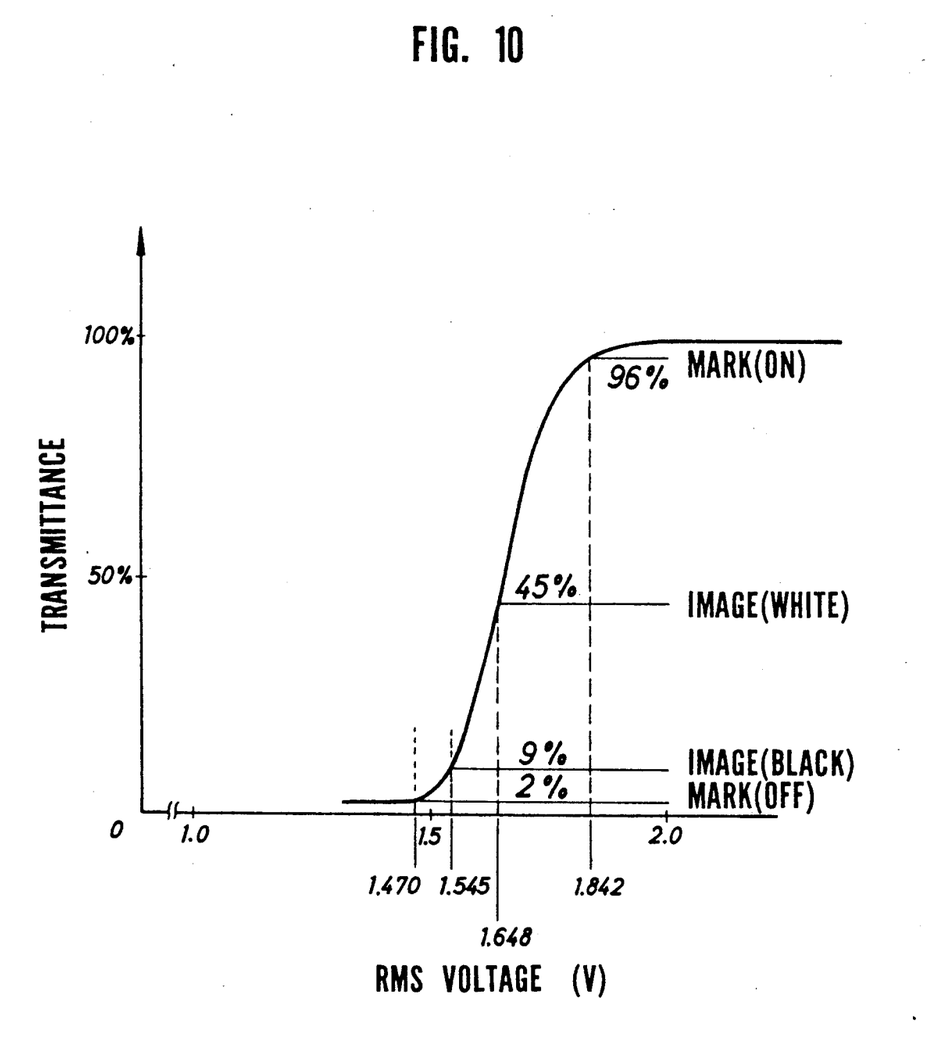
FIG. 10 is a graph of voltage vs. transmittance characteristics to compare and explain contrast levels of image and indicator portions of the liquid crystal panel of the liquid crystal television shown in FIG. 1.

FIG. 10 is a graph showing the voltage vs. transmittance characteristics (T-V curve) according to the present invention. As can be apparent from this graph, the contrast ratio in the image portion is 5:1, while the contrast ratio of the indicator portion is greatly increased to 48:1. This contrast difference can be achieved by a voltage difference between the marker signal and the image signal and the drive voltage waveform fixed to about the common potential during a period except for the marker display timing, as shown in FIG. 8.

In FIG. 8, in order to clearly distinguish the contrast in the image portion from the contrast in the indicator portion, the pitches of the hatched lines are changed. When the pitch is small, a display color close to black. As is apparent from this gradation, the indicator portion can be easily distinguished from the image portion. The marker in the indicator portion can be clearly distinguished from the image portion.

In the above embodiment, the binary counter K202 of the A/D converter 28 is separated from the binary counter K251 of the D/A converter 29. However, these binary counters can be constituted by a single binary counter. This applies to the timers K201 and K253, and the lower seven bits of the digital comparators K207 and K252.

What we claim is:

1. In a liquid crystal television including a television receiver for receiving a television broadcast signal and outputting a video signal, a tuning voltage control unit for outputting a tuning voltage for said television receiver, and a liquid crystal display unit having a liquid crystal panel, said liquid crystal panel being arranged to simultaneously display a broadcast image and channel mark, comprising:
   a plurality of common electrodes;
   a plurality of segment electrodes divided into image segment electrodes and indicator segment electrodes;
   an image segment driver for receiving the video signal from said television receiver and driving said image segment electrodes according to a first voltage waveform; and
   an indicator segment driver for receiving the tuning voltage from said tuning voltage control unit and driving said indicator segment electrodes according to a second voltage waveform different from that of said first voltage waveform.

2. A television according to claim 1, wherein a plurality of indicator segment electrodes corresponding to a length of said channel mark are arranged at a first or second end of said liquid crystal panel to constitute said indicator display portion.

3. A television according to claim 1, wherein said indicator segment driver is driven by a signal having a voltage waveform whose magnitude is larger than that of said image segment driver.

4. A television according to claim 3, wherein said indicator segment driver outputs a signal having a voltage waveform for fixing a potential of said indicator segment electrodes to substantially a common potential during a period excluding timings for displaying said channel mark.

5. A television according to claim 1, wherein color filter stripes of R (red), G (green), and B (blue) are formed on said image and indicator segment electrodes formed in said liquid crystal panel.

6. A television according to claim 5, wherein said indicator segment electrodes are divided into first color selection electrodes corresponding to filters of one color of the R, G, and B and second color selection electordes obtained by commonly connecting filters of remaining two colors.

7. A television according to claim 6, wherein all said first color selection electrodes in said indicator display portion are commonly connected to provide a first common electrodes, and said second color electrodes are commonly connected to provide a second common electrode.

8. A television according to claim 7, wherein one of a VHF channel mark ON signal and a UHF channel mark ON signal selectively output from said indicator segment driver is supplied to said first common electrode, and the other of the VHF and UHF channel mark ON signals is supplied to said second common electrode.

* * * * *